(12) United States Patent
Hilaire et al.

(10) Patent No.: US 6,290,878 B1
(45) Date of Patent: Sep. 18, 2001

(54) SOLID POLYMER ELECTROLYTE BASED ON POLYACRYLONITRILE

(75) Inventors: Michel Hilaire, Fontenay les Briis; Carole Moneuse, Angervillier, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/292,304

(22) Filed: Apr. 15, 1999

(30) Foreign Application Priority Data

Apr. 16, 1998 (FR) .................................................. 98 04744

(51) Int. Cl.⁷ ...................................................... H01B 1/04
(52) U.S. Cl. ......................... 252/502; 252/503; 252/506; 252/509; 252/518.1; 252/62.2; 429/190; 429/192; 429/194; 429/198
(58) Field of Search .................................. 252/502, 503, 252/509, 506, 518.1, 62.2; 429/190, 192, 194, 198

(56) References Cited

U.S. PATENT DOCUMENTS

| 5,426,005 | 6/1995 | Eshbach ................................ 429/192 |
| 5,631,103 | 5/1997 | Eshbach et al. ...................... 429/190 |
| 5,639,573 | 6/1997 | Oliver et al. ......................... 429/190 |

FOREIGN PATENT DOCUMENTS

WO 97/08765 3/1997 (WO).
WO 98/37589 8/1998 (WO).

OTHER PUBLICATIONS

Database WPI, Sechtion CH, Week 9521, Derwent Publications Ltd., London, GB; Class A14, AN 95–159125, XP002088820 corresponding to JP 07 082450 A (Matsushita Denki Sangyo KK) Mar. 28, 1995.
Chemical Abstracts, vol. 104, No. 2, Jan. 13, 1986, Columbus, OH, US; Abstract No. 8315, Tamura, Masatoshi et al, "Solid electrolyte", XP00208819 corresponding to JP 60165058 A (Orient Wtach Co., Ltd.) Japan.
Morihiko Matsumoto et al, "Polymer Electrolytes with Multiple Conductive Channels Prepared from NBR/SBR latex Films Impregnated with Lithium salt and Plasticizer", J. Electrochem. Soc., vol. 142, No. 9 Sep. 1995, pp. 3052–3057, XP002088818.

*Primary Examiner*—Yogendra N. Gupta
*Assistant Examiner*—Derrick G. Hamlin
(74) *Attorney, Agent, or Firm*—Sughrue, Mion, Zinn, Macpeak & Seas, PLLC

(57) ABSTRACT

The invention provides a solid polymer electrolyte comprising a polymer which is a polyacrylonitrile, a plasticizer made up of a lithium salt in solution in a liquid organic solvent, and a reinforcing agent which is an organic compound constituted by porous grains of a polymer having polyamide structural units.

15 Claims, 1 Drawing Sheet

SOLID POLYMER ELECTROLYTE BASED ON POLYACRYLONITRILE

The present invention relates to a solid polymer electrolyte based on polyacrylonitrile for use in a rechargeable lithium cell.

BACKGROUND OF THE INVENTION

"Gelled" solid polymer electrolytes comprise a polymer having, incorporated therein, a plasticizer containing organic solvents and a lithium salt. The plasticizer is trapped in the three-dimensional structure of the polymer. The resulting substance forms a single phase.

Gelled electrolytes based on polyacrylonitrile have poor mechanical behavior during cycling, and that gives rise, in particular, to a decrease in the thickness of the electrolyte layer. This creep contributes to premature aging of the cell and shortens the time during which it can be used. This phenomenon is made worse when the cell is required to operate at temperatures in excess of 45° C.

To remedy the problem, proposals have been made to add a reinforcing agent to the electrolyte in the form of an inorganic filler, in particular based on silica. That solution requires about 5% to 10% by mass of additive to be added, representing a large volume because of the low density of the filler, of the order of 36 mg/cm$^3$.

U.S. Pat. No. 5,631,103 describes an electrolyte having a gelled polymer with a filler constituting more than 50% by weight of the electrolyte. The filler is either an inorganic material or an inert polymer.

Adding such a filler represents a considerable volume. It results in defects of wetting by the plasticizer, and in non-uniformity in filler distribution. This gives rise to dispersion in performance and to lifetime at high temperature that is not improved. In addition, those mixtures have poor pourability which makes them difficult to spread using industrial means.

OBJECTS AND SUMMARY OF THE INVENTION

An object of the present invention is to propose a gelled solid polymer electrolyte having mechanical strength that is satisfactory while it is in use in an electrochemical cell such that its lifetime is extended, in particular for use at temperatures greater than 45° C.

The present invention provides a solid polymer electrolyte comprising a polymer which is a polyacrylonitrile, a plasticizer made up of a lithium salt in solution in a liquid organic solvent, and a reinforcing agent which is an organic compound constituted by porous grains of a polymer having polyamide structural units.

The pore size of these grains is 0.7 $\mu$m±0.2 $\mu$m and their pore volume lies in the range 0.2 cm$^3$/g to 0.6 cm$^3$/g. A supply of plasticizer is thus constituted within the available pore volume, thereby contributing to extending the lifetime of the cell.

The density of the grains lies in the range 1 g/cm$^3$ to 1.2 g/cm$^3$ and their specific surface area lies in the range 1 m$^2$/g to 30 m$^2$/g. Their average size lies in the range 5 $\mu$m±1.5 $\mu$m to 60 $\mu$m±1.5 $\mu$m.

The content of said agent preferably lies in the range 1% to 10% by weight of said electrolyte.

The invention also provides a cell containing an electrolyte according to the invention, in which the negative active material is a carbon-containing material suitable for inserting lithium in its structure.

The present invention also provides a method of manufacturing a gelled solid polymer electrolyte of the invention. The method comprises the following steps.

Firstly the grains of the organic compound are impregnated with the solvent.

Secondly the plasticizer comprising the lithium salt in solution in the liquid organic solvent is mixed with the polymer. The polymer is preferably in powder form. This operation is preferably performed hot, but nevertheless at a temperature of less than 100° C. so as to avoid decomposition of the lithium salt. The mixture then takes on the viscous consistency of a gel.

Thereafter, the solvent-impregnated grains are introduced into the gelled mixture.

Finally, the electrolyte constituted by the mixture containing the grains is shaped, e.g. by pouring the mixture into a mold or onto a plate to form a film. This shaping operation is preferably performed hot, at a temperature of less than 100° C.

To avoid shearing the polymer chains, the gel can be pressed, e.g. between a plate of polytetrafluoroethylene (PTFE) and a sheet of aluminum. This makes it possible to obtain thin films of gel, e.g. films that are about 100 $\mu$m thick.

BRIEF DESCRIPTION OF THE DRAWINGS

Other characteristics and advantages of the present invention appear from the following examples given by way of non-limiting illustration, and from the accompanying drawing, in which.

MORE DETAILED DESCRIPTION

EXAMPLE 1

(Comparative)

A prior art solid polymer electrolyte film was made as follows.

An organic solvent was prepared comprising 20% by weight propylene carbonate (PC) and 80% by weight ethylene carbonate (EC). The solvents were previously dried on alumina, and then the solvents were mixed while heating to 40° C. in order to liquefy the EC.

Polyacrylonitrile powder was dissolved in the solvent, and then lithium hexafluorophosphate (LiPF$_6$) was added. This operation was performed at 90° C.

The hot electrolyte was then poured onto a plate of inert material so as to obtain a 120 $\mu$m thick film from which a 21 mm diameter disk was cut. The electrolyte comprised 81% by weight organic solvent, 10% polyacrylonitrile, and 9% lithium salt.

Figure 1:
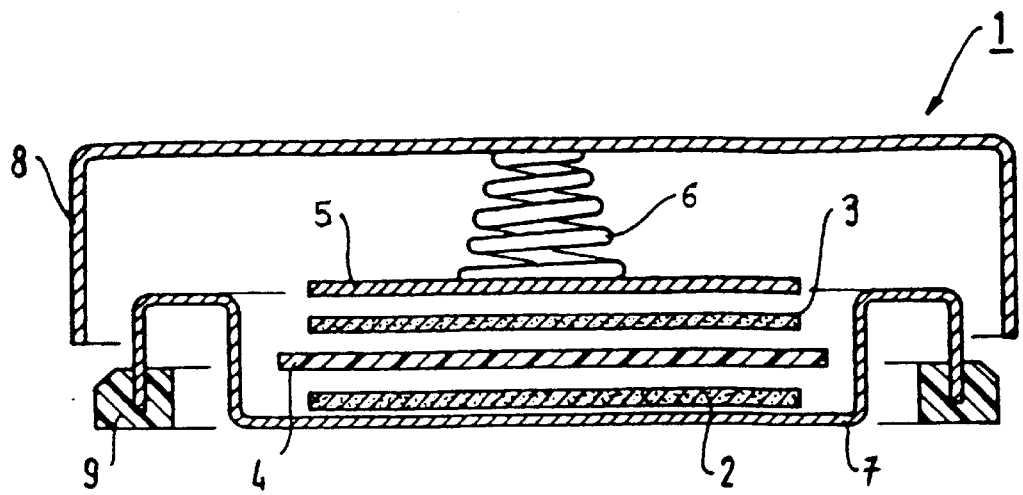
FIG. 1 shows a button-format storage cell containing a solid polymer electrolyte.

A button-format cell 1 was assembled as shown in FIG. 1. A cathode 2 was made by encrusting a certain quantity of a paste containing the positive active material, which was a lithium manganese oxide LiMn$_2$O$_4$, on a current collector. After drying and cutting out using an appropriate tool, an electrode was obtained in the form of a disk having a diameter of 12 mm. The anode 3 was constituted by a disk of metallic lithium having a diameter of 16 mm. The electrodes 1 and 2 were separated by the previously manufactured electrolyte film 4. A stainless steel spacer 5 served to pick up electrical current and a spring 6 maintained contact between the various elements of the cell. The assembly was impregnated with electrolyte and placed in a cup 7 closed in sealed manner by a cover 8 via a polypropylene gasket 9.

Two identical storage cells were then evaluated electrochemically, one during cycling and the other during storage at high temperature.

A cycling test was performed under the following conditions:

cycles 1 to 18:
    charge at Ic/10 to a voltage of 4.3 V,
    discharge at Ic/10 to a voltage of 3 V
from cycle 19:
    charge at Ic/10 to a voltage of 4.3 V
    discharge at Ic/5 to a voltage of 3 V (where Ic is the current required for discharging the nominal capacity of the cell in 1 hour).

Figure 2:
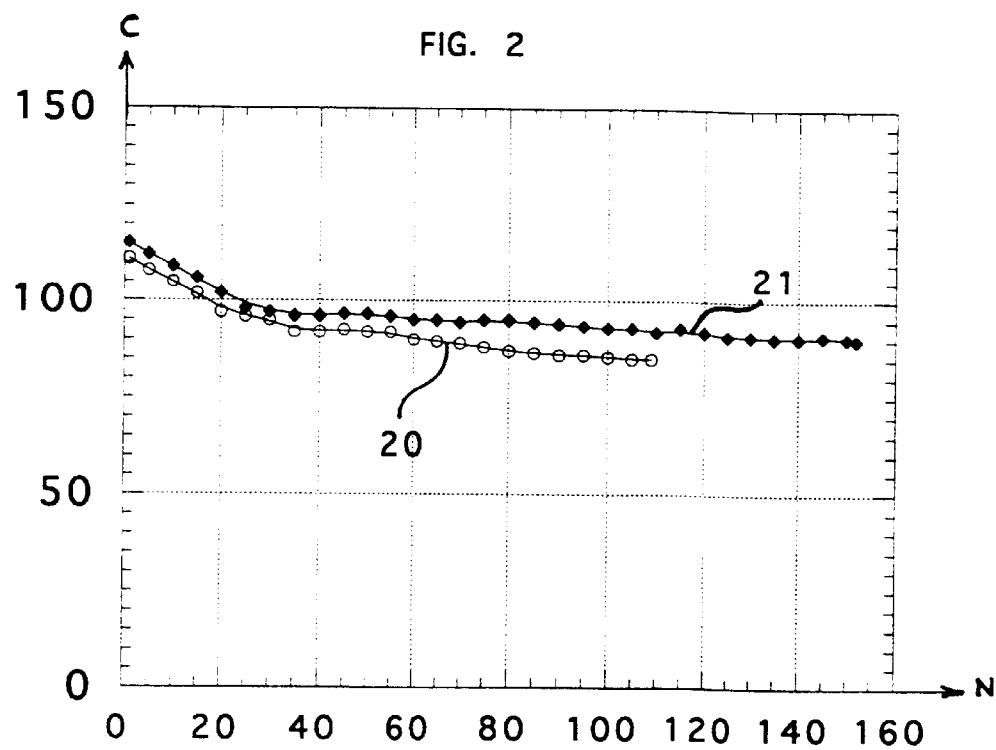
FIG. 2 shows the cycling of two button-format cells containing a solid polymer electrolyte, one from the prior art and the other containing a reinforcing agent of the invention; the capacity C in mAh/g of the positive active material is plotted up the ordinate and the number of cycles performed N is plotted along the abscissa.

The result of cycling for 110 cycles is given by curve 20 in FIG. 2. The initial capacity of the cell was 110 mAh/g and it decreased to 85 mAh/g on cycle 109. A short circuit then occurred which brought the life of the cell to an end. When the cell was opened, it was observed that the electrolyte film had become thinner and had torn. This state was the result of the traction exerted on the film by variations in the dimensions of the electrodes during cycling.

A high temperature storage test was also performed. A charge/discharge cycle was performed at ambient temperature at a rate of 115 mAh/g on active material. Thereafter, the cell was stored for 1 month at 45° C. When the cell was opened, it was observed that the electrolyte film had cracks that would give rise to short circuits and premature failure of the cell.

EXAMPLE 2

A solid polymer electrolyte film of the invention was made as follows.

8 g of an organic solvent was prepared comprising 20% by weight of propylene carbonate (PC) and 80% by weight of ethylene carbon (EC) as in Example 1. 0.4 g of grains of additive constituted by a polyamide sold by ATOCHEM under the trade name "ORGASOL" were impregnated by the solvent.

1 g of polyacrylonitrile powder and then 0.934 g of lithium hexafluorophosphate ($LiPF_6$) were dissolved in the solvent which was maintained at about 90° C. The hot electrolyte was then poured onto a plate of inert material in order to obtain a film having a thickness of 120 $\mu$m.

A button-format storage cell was assembled analogous to that in FIG. 1, containing the electrolyte film of the invention. One cell was evaluated in cycling and another cell in storage as described in Example 1.

The result of cycling over 152 cycles is given by curve 21 of FIG. 2. The initial capacity of the cycled cell was 115 mAh/g, and it decreased to 90 mAh/g. The lifetime of the cell was 38% longer than the prior art.

When the cell which had been subjected to the storage test at 45° C. was opened, the appearance of electrolyte film was not degraded and its thickness was 70 $\mu$m.

Naturally, the various numerical values given are given purely by way of non-limiting example.

What is claimed is:

1. A solid polymer electrolyte comprising:
    a polymer which is a polyacrylonitrile,
    a plasticizer comprising a lithium salt in solution in a liquid organic solvent, and
    a reinforcing agent which is an organic compound comprising porous grains of a polymer having polyamide structural units, wherein the content of said agent is in the range 1% to 10% by weight of said electrolyte.

2. An electrolyte according to claim 1, in which the size of the pores of said grains is 0.7 $\mu$m±0.2 $\mu$m.

3. An electrolyte according to claim 1, in which said grains have a pore volume in the range 0.2 $cm^3$/g to 0.6 $cm^3$/g.

4. An electrolyte according to claim 1, in which said grains have a density in the range 1 $g/cm^3$ to 1.2 $g/cm^3$.

5. An electrolyte according to claim 1, in which said grains have a specific surface area in the range 1 $m^2$/g to 30 $m^2$/g.

6. An electrolyte according to claim 1, in which said grains have an average size in the range 5 $\mu$m±1.5 $\mu$m to 60 $\mu$m±1.5 $\mu$m.

7. A cell containing a solid polymer electrolyte comprising:
    a polymer which is a polyacrylonitrile,
    a plasticizer comprising a lithium salt in solution in a liquid organic solvent, and
    a reinforcing agent which is an organic compound comprising porous grains of a polymer having polyamide structural units, wherein the content of said agent is in the range 1% to 10% by weight of said electrolyte,
said cell including a negative active material which is a carbon-containing material suitable for inserting lithium in its structure.

8. A method of manufacturing a solid polymer electrolyte, said method comprising the following steps:
    (a) impregnating porous grains of a polymer having polyamide structural units with a liquid organic solvent;
    (b) mixing a plasticizer comprising a lithium salt in solution in a liquid solvent with a polymer which is a polyacrylonitrile to provide a plasticizer/polyacrylonitrile mixture;
    (c) introducing the impregnated grains into said plasticizer/polyacrylonitrile polymer mixture; and
    (d) shaping said mixture containing said grains into a solid polymer electrolyte.

9. The method of claim 8, wherein the polymer in step (b) is in powder form.

10. The method of claim 8, wherein the mixing step (b) and/or the shaping step (d) is performed hot, at a temperature of less than 100° C.

11. The method of claim 8, wherein the shaping step (d) includes pouring the mixture into a mold or onto a plte to form a film.

12. The method of claim 8, further comprising a step of pressing the mixture to obtain a thin gel film of about 100 $\mu$m thick.

13. The method of claim 12, wherein the pressing is between a plate of polytetrafluoroethylene and a sheet of aluminum.

14. The method of claim 8, wherein the organic solvent is 20% by weight propylene carbonate and 80% by weight ethylene carbonate.

15. The method of claim 8, wherein the lithium salt is lithium hexafluorophosphate.

\* \* \* \* \*